Figure 1:
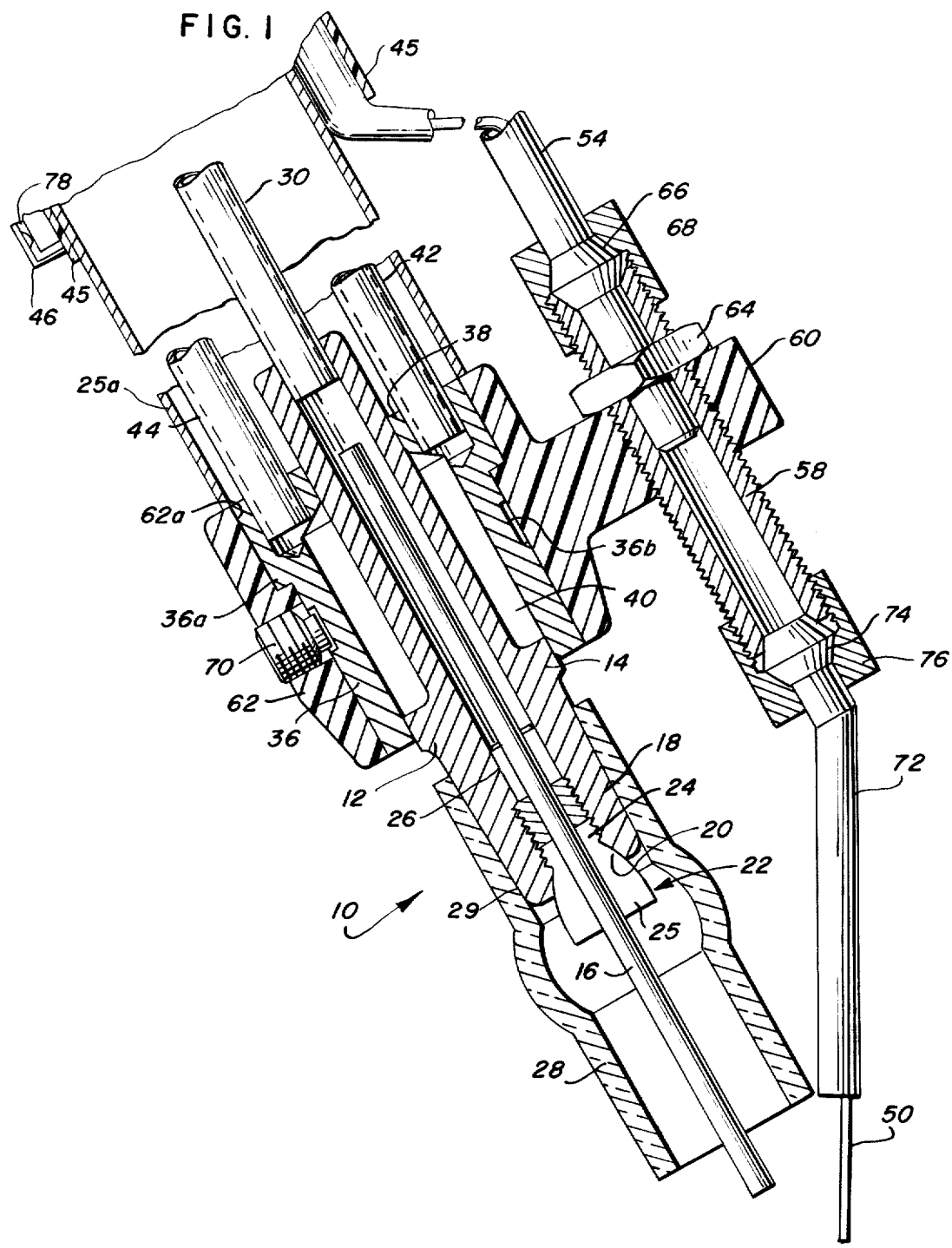

United States Patent [19]

Stearns et al.

[11] 3,940,586
[45] Feb. 24, 1976

[54] ELECTRIC ARC WELDING
[75] Inventors: James B. Stearns; Donald W. Schmerling, both of York, Pa.
[73] Assignee: ESAB Manufacturing, Inc., Charlottesville, Va.
[22] Filed: Mar. 26, 1973
[21] Appl. No.: 344,909

[52] U.S. Cl. .................. 219/75; 219/130; 219/136
[51] Int. Cl.² ........................................ B23K 9/12
[58] Field of Search ......... 219/74, 75, 76, 130, 136, 219/137, 131, 131 E

[56] References Cited
UNITED STATES PATENTS

| | | | |
|---|---|---|---|
| 2,360,160 | 10/1944 | Pickhaven | 219/74 |
| 2,644,070 | 6/1953 | Herbst | 219/130 |
| 2,710,902 | 6/1955 | Pilia | 219/74 |
| 2,723,331 | 11/1955 | Tyrnch | 219/130 |
| 2,778,099 | 1/1957 | Anderson et al. | 219/130 |
| 2,892,925 | 6/1959 | Butterfield et al. | 219/130 |
| 3,056,018 | 9/1962 | Peterson | 219/131 F |
| 3,102,947 | 9/1963 | Blackman | 219/130 |
| 3,428,774 | 2/1969 | Faust et al. | 219/130 |

Primary Examiner—J. V. Truhe
Assistant Examiner—Clifford C. Shaw

[57] ABSTRACT

An electric arc welding system includes a welding torch having a head supporting a nonconsumable, elongated electrode for establishing an arc and between a work piece and an outer end of the electrode. The system further includes nozzle means for supplying an inert gas shield around the longitudinal axis of the electrode and said arc and conductor means for supplying current to the electrode for establishing and maintaining the arc. Means are provided for feeding filler wire toward the longitudinal axis of the electrode and the arc along a feed path intersecting the axis at an acute angle. The feeding means includes means for advancing the filler wire along the feed path in repetitive incremental strokes separated by alternating periods of stationary dwell.

22 Claims, 2 Drawing Figures

ELECTRIC ARC WELDING

The present invention relates generally to electric arc welding and more particularly to a new and improved manual arc welding system for unskilled welders which is provided with an automatic feed system for advancing filler wire into the arc or weld puddle.

In presently existing hand welding systems using the tungsten inert gas (TIG) process an arc welding gun or torch is manipulated in one hand while a discrete length of filler wire held in the other hand is manipulated and dipped intermittently into the arc or molten weld puddle to form the weld. Present manual welding systems have many drawbacks and disadvantages, for example welding speeds are reduced because of the requirement for hand manipulation and feeding of the filler wire into the arc or molten weld puddle. Moreover, welding speed is reduced because the weld process must be stopped when each discrete length of filler wire become too short for convenience. The welder is required to throw away the short piece and pick up a new piece of weld filler wire before continuing the weld. Another disadvantage is that inclusions and foreign matter are created in the weld because of stoppage of the welding process and when this happens gouging out and rewelding of the area is required. Another difficulty encountered in present processes is the possibility of the welder grabbing the wrong type of filler wire and hence costly systems of color coding and identifying the discrete lengths of filler wire have been initiated to reduce the possibility of the wrong type of filler rod being used. However, even with marking and coding systems a welder often inadvertently reaches and grabs the wrong type of filler material thereby spoiling the weld joint and weakening the weld.

Hand manipulation and feeding of the filler wire causes contamination in the weld due to dirt, grease or salt present on the operator's hand and the full length of each piece of filler wire is not available because the short stub portion gets too hot to handle and is either thrown away (stub losses sometimes reach as high as 30% of the total quantity of filler material used) or time must be taken to weld the stub to a new piece of filler before proceeding. One of the most difficult problems with the presently existing hand welding systems is the requirement for a high degree of operator skill and training in addition to a high level of manual dexterity needed to produce high quality welds. It is difficult to make high quality welds in tight corners and cramped spaced when both hands are required. The present invention overcomes the aforementioned disadvantages of presently existing manual welding systems and it is therefore an object of the present invention to provide a new and improved arc welding system. More specifically it is an object of the present invention to provide a new and improved manual arc welding system wherein only one hand is required and feeding of the filler wire into the arc or weld puddle is automatically controlled.

Another object of the invention is to provide a new and improved manual arc welding system wherein the need for cutting filler wire into discrete lengths for convenient handling is not required. Another object is to provide a manual welding system wherein a continuous length of filler wire on a coil or spool is automatically fed into the weld puddle in a precisely controlled manner thereby eliminating waste and preventing contamination of the wire entering the weld area.

Another object of the present invention is to provide a new and improved manual arc welding system of the character described wherein the process of intermittently dipping of the filler wire into the weld puddle or arc region is automatically controlled and mechanically duplicates the normal hand process with results of drastically reducing operator fatigue and skill requirements while providing higher welding speeds and higher quality welds.

Another object of the present invention is to provide a new and improved manual arc welding system which can utilize unskilled persons without previous training, yet still provide high quality welds.

Another object of the present invention is to provide a new and improved arc manual welding system requiring only one hand of a welder to control and manipulate thus reducing fatique of the welder and achieving better accessibility in corners, joints and tight or cramped spaces.

Another object of the present invention is to provide a new and improved manual arc welding system wherein only one hand is requird to manipulate the torch and automatically feed the welding filler wire in a precisely controlled manner into the arc region or weld puddle.

Still another object of the present invention is to provide a new and improved manually controlled automatic filler rod feed system for advancing weld filler wire into the arc or weld puddle at selected feed rates on advance strokes of selected discrete intervals between alternate periods of dwell of selected duration.

Another object of the invention is to provide a novel control system for feeding a continuous elongated member such as weld filler wire in a series of successive, discrete intermittent feed strokes of selected rate and interval between periods of dwell of selected interval.

Another object of the present invention is to provide a new and improved manual arc welding torch which is readily handled with one hand for easy manipulation into cramed or tight corners or spaces yet affording the welder a better view of the immediate weld area.

Another object of the invention is to provide a new and improved hand held arc welding torch of the TIG type which can be used to produce high quality welds with less operator fatigue and without requiring extensive training or manual skill for the operators.

Another object of the present invention is to provide a new and improved manual arc welding torch wherein weld filler wire is fed over the top of the torch to intersect the weld puddle or arc from the front side at an acute angle in the range of 30° to 45° relative to the axis of nonconsumable electrode.

Still another object of the invention is to provide a new and improved manual arc welding torch which is compact in size and affords excellent visibility of the arc and weld filler wire feed and which does not use the weld filler wire as a means of locomotion of the hand manipulated torch.

Yet another object of the present invention is to provide a new and improved manual arc welding torch of the character described in combination with automatically controlled feed means for intermittently feediing weld filler wire into the arc or weld puddle directly controllable by conveniently located switch means on the torch itself.

Figure 2:
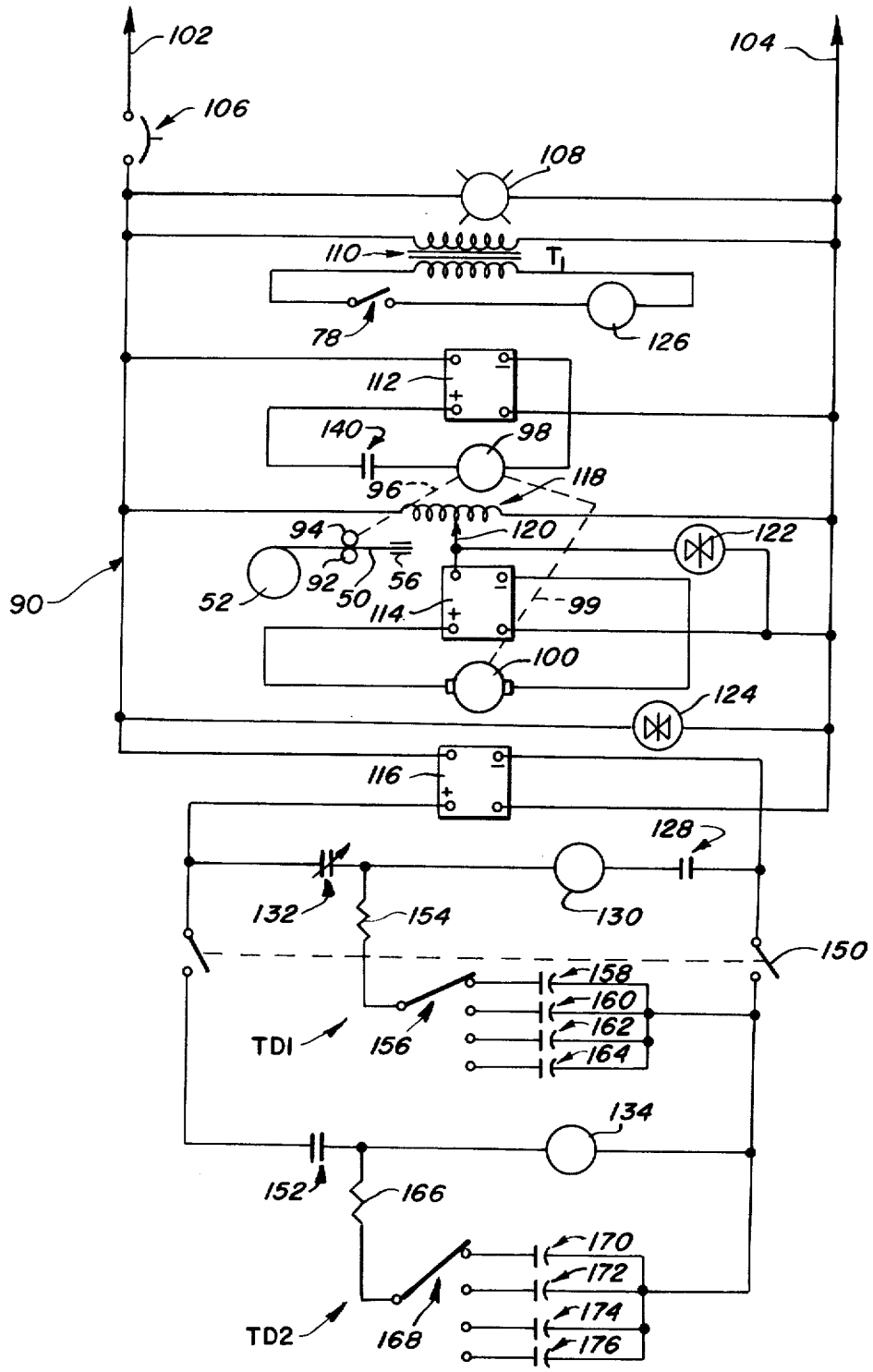

For a better understanding of the invention reference should be had to the following detailed description taken in conjunction with the drawings in which:

FIG. 1 is a longitudinal cross-sectional view, partially broken away, of a new and improved manual arc welding torch constructed in accordance with the features of the present invention, and FIG. 2 is a schematic diagram of a control circuit for an automatic weld filler wire feed system constructed in accordance with the features of the present invention.

Briefly, the foregoing and other objects and advantages of the present invention are disclosed in an embodiment by way of illustration and not limitation which comprises a manual arc welding torch having a head supporting a nonconsumable electrode for establishing an arc between the lower end of the electrode and a workpiece. Annular nozzle means is provided for supplying an inert gas shield around the longitudinal axis of the electrode and arc and electrical conductor means is provided for supplying electrical current to the electrode for said arc. The torch includes handle means and control means for controlling the feed of weld filler wire toward intersection with a longitudinal axis of the electrode on a feed path which intersects the axis at an acute included angle from the front. The feeding means includes means for advancing the filler wire along said feed path in repetitive incremental advancing strokes between alternate periods of dwell. Means is provided for selectively controlling the feed velocity, the length of time or duration of each advancing stroke, and the length of dwell or idle time between successive strokes. Means is provided for continuous feeding of the filler wire if desired.

Referring now more particularly to the drawings, therein is illustrated a new and improved manual arc welding torch constructed in accordance with the features of the present invention and referred to generally by the reference numeral 10. The torch 10 is adapted to use the tungsten inert gas process, commonly known at TIG welding, and includes an elongated, hollow tubular body 12 having an axial bore extending therethrough and an outwardly extending radial flange 14 spaced intermediate the upper and lower ends thereof. The body 12 of the torch is adapted to support an elongated, nonconsumable tungsten electrode 16 extended through the axial bore and the lower end of the electrode is adapted to establish and maintain an arc with a workpiece spaced therebelow which is to be welded. For the purpose of supporting the electrode in coaxial alignment within the bore of the body 12, the lower end of the axial bore is formed a frustroconical shaped wedging surface 20 and a threaded section 18 extending upwardly thereof. An elongated tubular electrode holder 22 is adapted to be threaded into the threaded section 18 and for this purpose includes threaded upper end portion 24. The electrode holder is formed with a plurality of longitudinal slots which form deflectable fingers 25 adjacent the lower end and each finger has an enlarging tapered lower end portion which bears against the frustroconical surface 20 of the tubular body. When the electrode holder 22 is tightened in the threaded bore section 18, the fingers 25 are biased inwardly against the electrode to firmly hold and establish electrical contact therewith. The upper end portion of the electrode extends upwardly into the hollow axial bore of the torch body or housing 12 and one or more radially spaced centering lands 26 are provided in the bore to coaxially align the electrode. The longitudinal slots in the holder 22 and the spaces between the lands 26 permit the passage of inert gas downwardly through the hollow bore of the body to form an inert gas shield around the electrode and the arc which is established between the lower end thereof and a workpiece. In order to guide the gas flow downwardly from the lower end of the body 12 to form the inert gas shield, there is provided a tubular gas nozzle having an upper end portion formed with a slightly tapered frustroconical bore adapted to slip onto a similarly tapered outer surface 29 on the lower end portion of the tubular body 12 below the radial flange 14. The tubular gas nozzle 28 is formed of an electrically nonconductive and relatively inert Pyrex glass or ceramic material. At the upper end, the tubular body 12 is connected to a gas supply conduit 30 for supplying inert gas (for example, a mixture of Helium and Argon) to shield the arc and weld puddle as is known.

In order to provide for cooling of the torch body 12 and carrying away the intense heat generated in the region of the arc and weld puddle, the torch 10 is provided with an annular upper body or sleeve 36 having an inside diameter substantially equal to the outer diameter of the radial flange portion 14 on the body 12. The upper end of the sleeve 36 is closed by an integral end wall 38 having a central opening therein for the upper end portion of the tubular body structure which is connected to the gas tube 30. Suitable sealing means, such as brazing, is used to seal between the upper end wall 38 of the sleeve 36 and the upper section or tubular stem of the body 12. At the lower end, the sleeve 36 is similarly sealed and joined to the outer surface of the radial flange portion 14 thus forming an annular cooling chamber 40 around the body intermediate the ends for the circulation of coolant water. The coolant water is directed into the torch head from a supply tube 42 and after it passes through the chamber 40, the water is discharged through a water discharge tube 44. The water tubes 42 and 44 are attached to the upper end wall 38 of the outer housing sleeve 36 and are sealed into the opening ports of the wall, as by brazing.

As in conventional TIG torches, the tubes 30, 42 and 44 are enclosed in an electrically insulating handle 45 over cover 25a permitting the torch to be held by an operator. The handle is provided with a trigger 46 or the like, arranged to actuate a switch 78 to be described hereinafter. Also, welding current for the arc is conducted to the electrode 16 via these gas and water conduits. The tubular body 12 and sleeve 36 are electrically connected to the electrode 16 via the electrode holder 22.

In accordance with the present invention, a continuous length of weld filler wire 50 supplied from a remotely positioned spool or reel 52 (FIG. 2) is fed into the arc or weld puddle at an acute included angle relative to the longitudinal axis of the electrode 16 as best shown in FIG. 1. A preferred angle range for introduction of the filler wire is 30°–45° in contrast to angles of 75° used for spot welding and angles in the range of 10°–25° for the process of U.S. Pat. No. 3,588,464. The weld filler wire is fed through a tube 54 which extends over the top side of the torch and bends downwardly on the forward or front side of the body 12 as viewed in FIG. 1. The tube 54 is connected at its rearward end to a flexible guide conduit 56 (FIG. 2) leading to the wire supply spool or reel 52. The lower forward end portion of the filler wire supply tube 54 extends into the upper end portion of the bore of hollow guide sleeve 58 having external threads thereon and mounted in a threaded opening provided in a radial arm 60 connected to a hollow sleeve 62 mounted on the body sleeve 36. The sleeve 62 and radial arm 60 are preferably integrally formed of reinforced resinous, insulating plastic and the guide sleeve 58 is secured firmly in place on the arm by a lock nut 64. The filler wire tube 54 is detachably secured to the sleeve with a compression ring 66 and internally threaded hexagonal coupling nut 68.

The body sleeve 36 is formed with an outwardly extending annular flange 36a adjacent the upper end, which flange seats within a mating recess 62a formed at the upper end of the axial bore of the sleeve 62. The sleeve 36 is provided with an inwardly extending annular groove 36b intermediate its ends in order to accommodate the inner end of a threaded set screw 70 for securing the outer sleeve 62 in a selected rotational position on the sleeve 36.

From the foregoing it will be seen that the radial position of the guide sleeve 58 may be adjusted as desired to suit an individual welder by loosening the set screw 70, rotating the arm 60 to a desired position and then retightening the set screw. Selective adjustment of the angular position of the arm 60 relative to the body 12 makes the torch extremely handy to use by both right and left hand welders. Similarly, the angular position of the arm 60 relative to the body can be adjusted to accommodate out-of-position welding.

At the lower end, the guide tube 58 is coupled to the upper end of a tubular guide structure 72 which directs the weld filler wire 50 towards the axis of the electrode 16 at the desired acute included angle, preferably in the range of 30° to 45°. A compression ring 74 is provided on the upper end portion of the guide structure 72 and a hexagonal internally threaded compression nut 76 is provided to secure the guide structure 72 in selected angular alignment with respect to the longitudinal axis of the electrode 16.

As will be described hereinafter in greater detail, the manual arc welding system of the present invention includes automatic means for feeding the weld filler wire 50 in respective advancing strokes of finite duration at a controlled feed rate between alternate dwell or idle periods of finite duration between successive strokes. In order to control and initiate the feed of the weld filler wire 50, the torch 10 is provided with a switch 78 (FIG. 2), which is controlled by a trigger, or the like, suitably mounted on the torch handle. Thus when an operator wants to initiate the feed of the weld filler wire 50, the switch 78 is closed. As long as the switch 78 remains closed, the wire is fed automatically into the arc or weld puddle. This permits the operator's other hand to be completely free of the normal task of feeding the filler wire as in present hand held torches.

A control circuit 90 (FIG. 2) is provided for feeding the weld filler wire 50 from the spool or reel 52 through the conduit 56 to the torch 10. The weld filler wire 50 is fed by a pair of pinch feed rollers 92 and 94. At least one of the rollers 92 or 94 (for example, as shown in FIG. 2, roller 94) is driven by a shaft 96 coupled to the output shaft of a clutch 98. The input side of the clutch 98 is driven by a shaft 99 which is rotated by a variable speed, DC motor 100 adapted to run continually when the circuit 90 is energized.

The circuit 90 includes a pair of AC power lines 102 and 104 connected to a suitable source of AC power (not shown). At least one of the lines 102 or 104 is provided with a switch or circuit breaker 106 for de-energizing or interrupting the circuit when desired. When the circuit breaker 106 is closed, a pilot light 108 is energized and the primary winding of a stepdown voltage transformer 110 is energized. In addition, a plurality of rectifiers 112, 114 and 116 are utilized to supply DC output power.

The rectifier 114 is supplied with a variable AC input voltage through an auto-transformer 118 having an adjustable tap 120 which is adjustable to supply the desired AC voltage for input to the rectifier 114. By varying the position of the tap 120 of the auto-transformer 118, the AC input voltage to the rectifier 114 is adjusted to thereby also adjust the DC output voltage from the rectifier 114. The variable DC output voltage from the rectifier 114 is used to control the speed of the motor 100. The speed of the motor 100 determines the feeding rate of the weld filler wire 50. The feeding rate of the weld filler wire 50 is thus selectively controllable by the positioning of the tap 120 of the autotransformer 118. Preferably, a feeding rate range is visually displayed on the auto-transformer 118 designating the required position for the tap 120 in order to achieve the desired feeding rate of the weld filler wire 50.

AC voltage surges across the auto-transformer 118 are suppressed by means of a surge suppressor 122. Similarly, voltage surges across the power lines 102 and 104 are suppressed by a surge suppressor 124.

The low voltage secondary coil of the stepdown transformer 110 is connected in series with the normally-open switch 78 for energizing or de-energizing a relay 126. The switch 78 may be closed by depressing the trigger on the handle of the welding torch 10. Energizing the relay 126 closed a pair of normally open relay contacts 128 to thereby energize a relay 130 serially connected with the contacts 128 and a pair of normally closed relay contacts 132 controlled by a relay 134. The contacts 128 and 132 are serially connected with the relay 130 across the DC output voltage terminals of the rectifier 116.

Energizing the relay 130 closes two pairs of normally open relay contacts 140 and 152. Closure of the contacts 140 energizes and engages the clutch 98. Energizing the clutch 98 transfers the motive power of the motor 100 to the drive roller 94 to feed the weld filler wire 50 at the feeding rate selected by the positioning of the tap 120 of the auto-transformer 118. De-energizing the relay 130 de-energizes and disengages the clutch 98 to interrupt the feeding of the weld filler wire 50. The DC output voltage of the rectifier 116 is used to energize the relay 134 through a double pole, single throw switch 150. The switch 150 is used to select either repetitive intermittent feeding or continuous feeding of the welding filler wire 50. With the switch 150 in its open position as shown, the clutch 98 is continuously energized through the closed contacts 140 controlled by the relay 130. The feeding of weld filler wire 50 is thus continuous at the feeding rate selected by the positioning of the tap 120 of the auto-transformer 118 until the switch 78 is opened.

In order to provide automatically controlled, repetitive, intermittent feeding cycles of a variably preselectable time duration and separated by dwell cycles of a variably preselectable time duration, the switch 150 is placed in its closed position to thereby energize the relay 134 through the contacts 152. Energizing relay 134 opens the contacts 132 to disconnect the relay 130 from the rectifier 116.

After the opening of the contacts 132, the relay 130 is maintained in an energized condition for a time period determined by a time delay circuit TD1. The circuit TD1 includes a resistance 154 serially connected with a single pole, quadruple throw selector switch 156 and a selected one of a plurality of capacitors 158, 160, 162 and 164, each having a different capacitance value resulting in different RC time constants. while the contacts 132 are closed, the selected capacitor 158, 160, 162 or 164 is charged by the DC output voltage from the rectifier 116. When the contacts 132 are opened in response to the energization of the relay 134, the charged capacitor 158, 160, 162 or 164 discharges through the resistance 154 to maintain the relay 130 in an energized condition for a time period corresponding to the RC time constant of the resistor 154, the resistance of the winding of the relay 130 and of the selected capacitor. Typical values for the capacitors 158, 160, 162 and 164 are 10, 20, 30 and 40 microfarads, resepctively. Using a 47 ohm resistor 154, and the resitance of the winding of the relay 130 feeding cycle time durations of 0.4, 0.64, 0.8 and 1.0 seconds are possible. When the selected capacitor has discharged, the relay 130 is de-energized to open the contacts 140 and 152. The opening of the contacts 140 de-energizes the clutch 98 to disconnect the motive power from the motor 100 to the feed roller 94; and the opening of the contacts 152 disconnects the DC output voltage from the rectifier 116 to the relay 134.

The circuit 90 further includes a second time delay circuit TD2 for controlling the time duration of the dwell cycle between repetitive feeding cycles of the weld filler wire 50. The circuit TD2 includes a resistor 166 serially connected through a single pole, quadruple throw selector switch 168 to a selected one of a plurality of capacitors 170, 172, 174, and 176, each having a different capacitance value resulting in different RC time constants. While the relay 130 is energized and the contacts 152 are closed, charging current from the rectifier 116 is supplied to charge the capacitor 170, 172, 174 or 176 selected by the placement of the switcvh 168. At the end of each feeding cycle when the relay 130 is de-energized, the contacts 152 are opened to disconnect the relay 134 from the DC output voltage of the rectifier 116. The relay 134 is maintained in an energized condition to provide the dwell portion of the operating cycle of the circuit 90 until the selected one of the capacitors 170, 172, 174 and 176 has discharged its stored charge. The discharge period or dwell cycle is determined by the values of the resistance of the resistor 166, the resistance of the winding of the relay 134 and the capacitance of the selected one of the capacitors 170, 172, 174 and 176. When the selected capacitor 170, 172, 174 or 176 is discharged, the relay 134 is de-energized to close the contacts 132. Closure of the contacts 132 energizes the relay 130 to close the contacts 140 and 152 resulting in the initiation of another feeding cycle of the welding filler wire 50. Typical values for the capacitors 170, 172, 174 and 176 are 10, 20, 30 and 40 microfarads respectively. Using a 47 ohm resistor 166, and the resistance of the winding of the relay 134 dwell cycle time durations of 0.4, 0.64, 0.8 and 1.0 seconds are possible.

The time duration of the feeding cycle of the circuit 90 is controlled by the positioning of the selector switch 156; and the time duration of the dwell cycle is controlled by the positioning of the selector switch 168. The positioning of the switch 150 determines whether the wire 50 is fed in a continuous manner or in a series of repetitive intermittent feeding cycles. The positioning of the tap 120 of the autotransformer 118 controls the feeding rate of the weld filler wire 50. The trigger on the handle initiates and terminates the feeding of the weld filler wire 50. The circuit 90 thus enables an operator of the torch 10 to select an optimum feeding pattern for the wire 50 for a particular application from a wide variety of available feeding patterns.

Although the present invention has been described with reference to a single illustration embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A manual arc welding torch comprising a handle to be guided by an operator, a head mounted on said handle, said head supporting a non-consumable electrode which is elongated along its longitudinal axis and having an outer end for establishing and maintaining an arc which extends substantially along said longitudinally axis outwardly from said outer end of said electrode toward a work piece spaced therefrom; conductor means for supplying current to said electrode for establishing and maintaining said arc; and means for feeding filler wire disposed such that a fed filler wire forms a feed path intersecting an extension of said longitudinal axis at a point outwardly of said outer end of said electrode, said feeding means including means for automatically, repetitively, advancing said filler wire after said arc is established and during the duration of said arc, said automatic, repetitive, advancing means advancing said filler wire along said feed path relative to said arc in repetitive incremental advancing strokes between alternate periods of dwell.

2. The arc welding torch of claim 1 wherein said feeding means further comprises electrical control means comprising first presettable means for variably selecting and controlling the time duration of each stroke and second presettable means for variably selecting and controlling the time duration of each dwell period, and said advancing means further comprises a motor, at least one drive roll drivingly engaging said filler wire and clutch means for intermittently interconnecting said motor to rotate said roll upon receipt of time pulses of electrical energy from said first presettable means.

3. The arc welding torch of claim 2 wherein said head includes an elongated tubular body in coaxial alignment around an upper portion of said electrode, spaced from said outer end and supporting said body including a lower end in communication with an upper end of said nozzle means for supplying gas thereto, said feeding means including a hollow tubular guide means supported by said body defining a portion of said feed path for said filler wire for guiding the same toward said intersection with said axis wherein said first presettable means includes a first time delay circuit for maintaining said clutch connected to said motor and wherein said second presettable means includes a second time delay circuit for maintaining said clutch disconnected from said motor.

4. The arc welding torch of claim 2 wherein said guide means includes an elongated sleeve in parallel relation with said body and arm means interconnecting said guide means and said sleeve including means for securing said sleeve in a selected one of several radial positions relative to said body.

5. The arc welding torch of claim 4 wherein said feed path and said axis intersect at an acute angle ranging between 30° and 45° and wherein said handle has a trigger electric switch and said guide means is located on substantially opposite sides of said handle from said switch.

6. The arc welding torch of claim 1 including means for initiating and terminating the operation of said automatic, repetitive, advancing means during at least a portion of the duration of said arc.

7. The arc weldiing torch of claim 6 wherein said automatic, repetitive, advancing means comprises first presettable means for variably selecting and controlling the time duration of each stroke and second presettable means for variably selecting and controlling the time duration of each dwell period.

8. The arc welding torch of claim 7 including nozzle means for supplying a gas for forming an inert gas shield around the longitudinal axis of said electrode and said arc.

9. The arc welding torch of claim 2 wherein said automatic, repetitive, advancing means comprises first presettable means for variably selecting and controlling the time duration of each stroke and second presettable means for variably selecting and controlling the time duration of each dwell period.

10. The arc welding torch of claim 1 including nozzle means for supplying a gas for forming an inert gas shield around the longitudinal axis of said electrode and said arc.

11. The arc welding torch of claim 1 wherein the angle formed between said extension of said axis and said outer end is an acute angle.

12. A manual arc welding torch comprising a handle to be guided by an operator, a head mounted on said handle, said head supporting a non-consumable electrode which is elongated along its longitudinal axis and having an outer end for establishing and maintaining an arc which extends substantially along said longitudinal axis outwardly from said outer end of said electrode toward a work piece spaced therefrom; conductor means for supplying current to said electrode for establishing and maintaining said arc; said welding torch having a device for controlling the feeding of a filler wire from a supply reel along a feed path into said arc, said device comprising
   means for feeding said filler wire along said path, after said arc is established and during the duration of said arc,
   means for initiating the operation of said feeding means,
   a first presettable means for variably controlling the rate of feeding of said filler wire by said feeding means
   bistable means for preselectably automatically controlling said feeding means to feed said filler wire in a continuous manner in the first state of said bistable control means or in a series of repetitive, intermittent feeding cycles in the second state of said bistable control means, each of said feeding cycles being followed by a dwell or non-feeding cycle,
   a second presettable means for variably selecting and controlling the time duration of each of said feeding cycles, and
   a third presettable means for variably selecting and controlling the time duration of each of said dwell cycles.

13. The welding torch as defined in claim 12 wherein said first presettable means includes a transformer having an adjustable output tap for providing an output voltage of a preselectable magnitude.

14. The welding torch of claim 12 including means for initiating and terminating the operation of said feeding means, wherein said feeding means includes a variable speed motor, the speed of said motor being responsive to said magnitude of said output voltage of said transformer.

15. The welding torch as defined in claim 12 wherein said feeding means further includes a pair of feed rollers and a clutch for connecting and disconnecting the output motive power of said motor to at least one of said feed rollers to rotate at least one of said feed rollers, and means for energizing said clutch to connect said motive power to at least one of said feed rollers in response to said initiating means.

16. The welding torch as defined in claim 15 wherein said second presettable means includes a first time delay circuit for maintaining said clutch energizing means in an operative state to thereby maintain said clutch in an energized state for a first variably preselectable time duration.

17. The welding torch as defined in claim 16 wherein said third presettable means includes a second time delay circuit for maintaining said clutch energizing means in an inoperative state to thereby maintain said clutch in a de-energized state for a second variably preselectable time duration.

18. The welding torch as defined in claim 17 wherein said second variably preselectable time duration immediately follows said first variably preselectable time duration when said bistable means is placed in said second state.

19. The welding torch as defined in claim 17 wherein said second time delay circuit is inactivated and rendered inoperative when said bistable means is placed in said first state.

20. A manual arc welding torch comprising a handle to be guided by an operator, a head mounted on said handle, said head supporting a non-consumable electrode which is elongated along its longitudinal axis and having an outer end for establishing and maintaining an arc which extends substantially along said longitudinal axis outwardly from said outer end of said electrode toward a work piece spaced therefrom; conductor means for supplying current to said electrode for establishing and maintaining said arc; said welding torch having a device for feeding a filler wire from a supply reel along a path of travel to said arc, said device comprising
   means for feeding said filler wire along said path in a series of repetitive, intermittent feeding cycles, each of said feeding cycles being followed by a dwell or nontransporting cycle, after said arc is established and during the duration of said arc,
   first means for variably preselecting the feeding rate of said feeding means,
   second means for variably preselecting the time duration of each of said feeding cycles, and
   third means for variably preselecting the time duration of each of said dwell cycles.

21. The welding torch as defined in claim 20 wherein said second means includes a first time delay circuit for maintaining said feeding means operative during said feeding cycles.

22. The welding torch as defined in claim 22 wherein said third means includes a second time delay circuit for maintaining said feeding means inoperative during said dwell cycles.

* * * * *